(12) United States Patent
Medina et al.

(10) Patent No.: US 11,287,019 B2
(45) Date of Patent: Mar. 29, 2022

(54) ACTUATOR

(71) Applicant: Goodrich Actuation Systems SAS, Saint Ouen l'Aumone (FR)

(72) Inventors: Raphael Medina, Ecouen (FR); Rui Amaral, Chambly (FR)

(73) Assignee: GOODRICH ACTUATION SYSTEMS SAS, Saint Ouen l'Aumone (FR)

( * ) Notice: Subject to any disclaimer, the term of this patent is extended or adjusted under 35 U.S.C. 154(b) by 160 days.

(21) Appl. No.: 16/711,770

(22) Filed: Dec. 12, 2019

(65) Prior Publication Data
US 2021/0062898 A1 Mar. 4, 2021

(30) Foreign Application Priority Data

Sep. 4, 2019 (EP) .................................... 19306070

(51) Int. Cl.
*F16H 25/20* (2006.01)
*F16H 25/24* (2006.01)
*B64C 13/28* (2006.01)

(52) U.S. Cl.
CPC ......... *F16H 25/205* (2013.01); *B64C 13/341* (2018.01); *F16H 25/2472* (2013.01)

(58) Field of Classification Search
CPC .. F16H 25/205; F16H 25/2472; B64C 13/341
See application file for complete search history.

(56) References Cited

U.S. PATENT DOCUMENTS

| | | | |
|---|---|---|---|
| 6,672,540 B1* | 1/2004 | Shaheen | F16H 25/2204 244/99.3 |
| 6,685,382 B2* | 2/2004 | Capewell | F16H 25/2204 403/343 |
| 8,291,782 B1* | 10/2012 | Shaheen | B64C 9/02 74/89.26 |
| 8,714,479 B1* | 5/2014 | Chapman | B64C 13/341 244/99.3 |

(Continued)

FOREIGN PATENT DOCUMENTS

| EP | 1283384 A3 | 2/2003 |
|---|---|---|
| EP | 3403925 A1 | 11/2018 |

OTHER PUBLICATIONS

European Search Report for Application No. 19306070.4, dated Feb. 21, 2020, 7 pages.

*Primary Examiner* — Terence Boes
(74) *Attorney, Agent, or Firm* — Cantor Colburn LLP

(57) ABSTRACT

There is provided an actuator comprising screw shaft and a nut assembly. The nut assembly comprises a primary nut for transmitting load through the actuator along a primary load path, and a secondary nut for transmitting load through the actuator along a secondary load path. The secondary nut comprises first and second portions movable relative to one another. As load is transmitted through the actuator along the primary load path the secondary nut does not transmit load through the actuator, wherein upon failure of the primary load path the first and second portions move relative to each other, such relative movement causing the first and second portions to engage the screw shaft and enable transmittal of load through the secondary nut of the actuator along the secondary load path.

14 Claims, 8 Drawing Sheets

(56) References Cited

U.S. PATENT DOCUMENTS

| | | | |
|---|---|---|---|
| 2002/0104394 A1* | 8/2002 | Manzanares | F16H 25/2472 |
| | | | 74/89.26 |
| 2003/0029258 A1* | 2/2003 | Davies | F16H 25/205 |
| | | | 74/89.26 |
| 2005/0016305 A1* | 1/2005 | Lardy | F16H 25/2472 |
| | | | 74/89.42 |
| 2007/0193381 A1* | 8/2007 | Rodrigues | F16H 25/205 |
| | | | 74/89.26 |
| 2014/0190291 A1* | 7/2014 | Medina | F16H 25/22 |
| | | | 74/89.23 |
| 2016/0281826 A1* | 9/2016 | Medina | B64C 13/341 |
| 2017/0036754 A1* | 2/2017 | Medina | B64C 13/341 |
| 2017/0335931 A1* | 11/2017 | Moulon | F16H 25/24 |
| 2018/0045291 A1* | 2/2018 | Teyssier | F16H 57/01 |
| 2018/0334239 A1* | 11/2018 | Moulon | B64C 5/16 |
| 2019/0107185 A1* | 4/2019 | Medina | B64C 13/341 |
| 2020/0391849 A1* | 12/2020 | Ricard | B64C 13/24 |
| 2020/0393027 A1* | 12/2020 | Ricard | F16H 25/2209 |

* cited by examiner

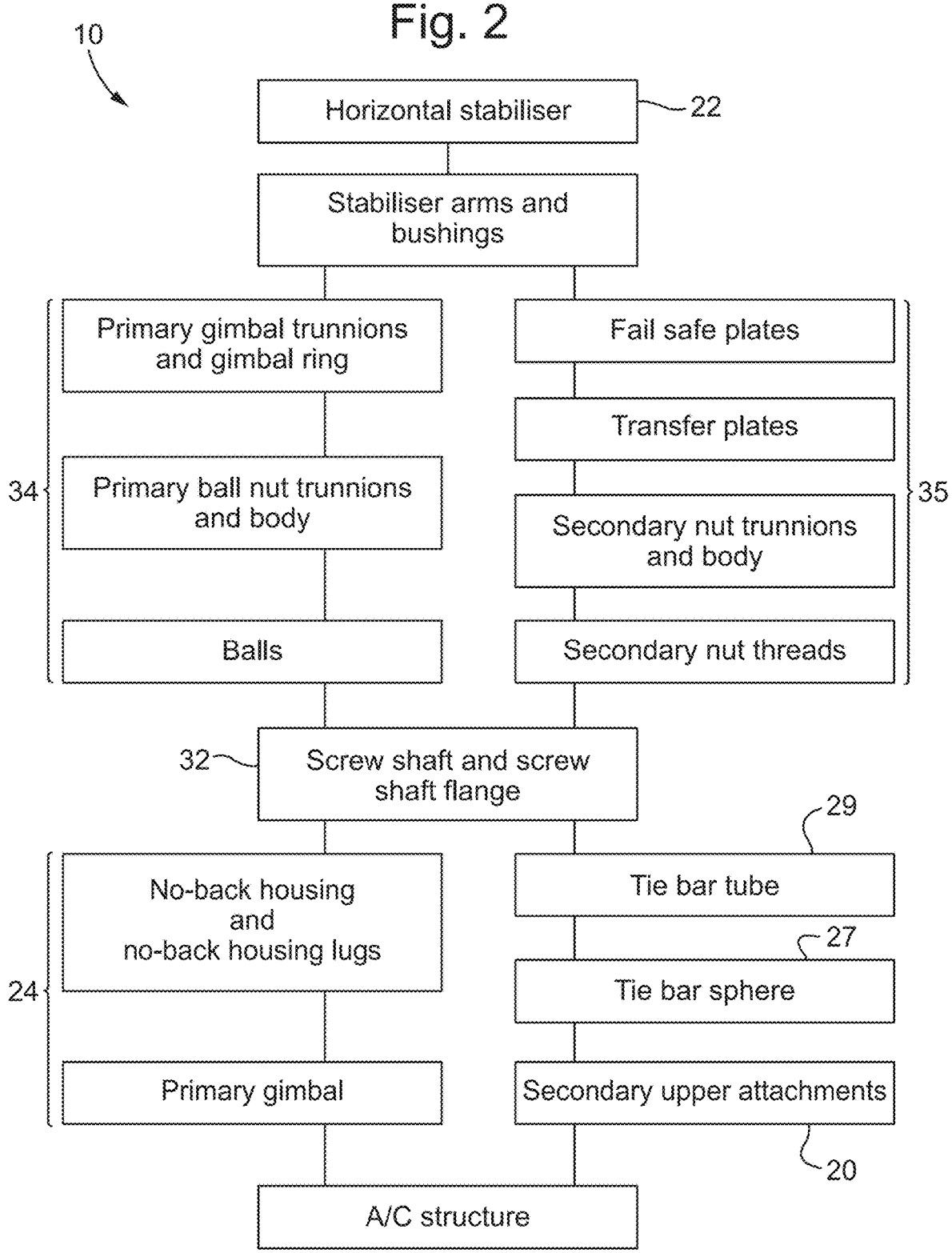

Fig. 3A
Primary load path
Fig. 3B
Secondary load path
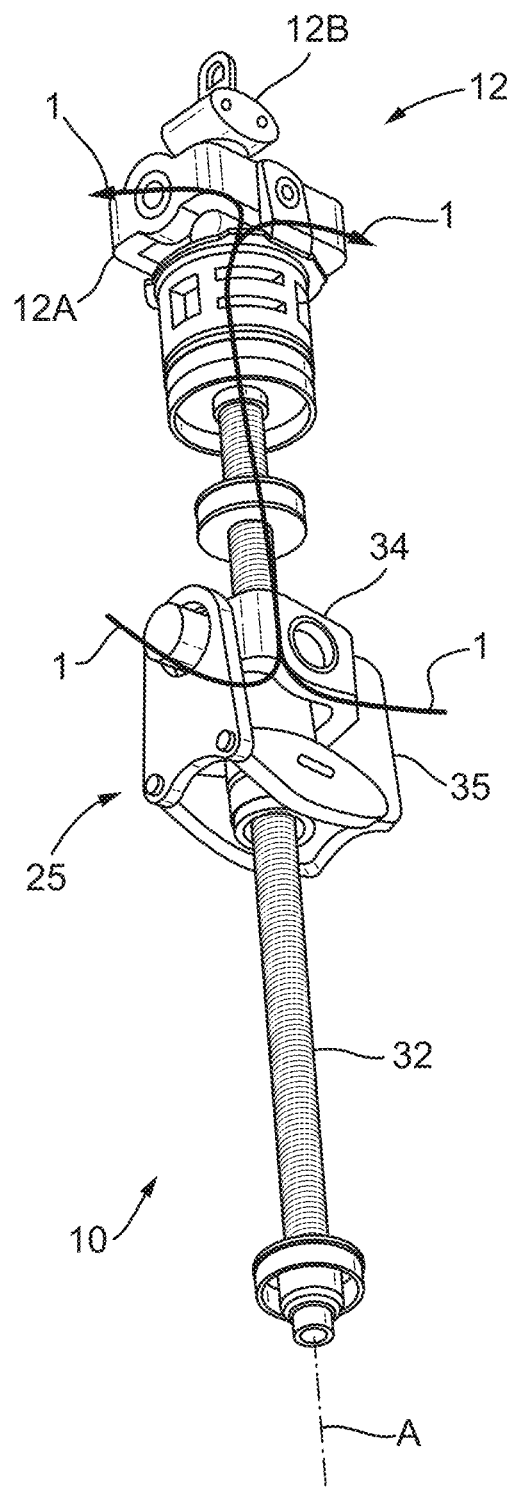
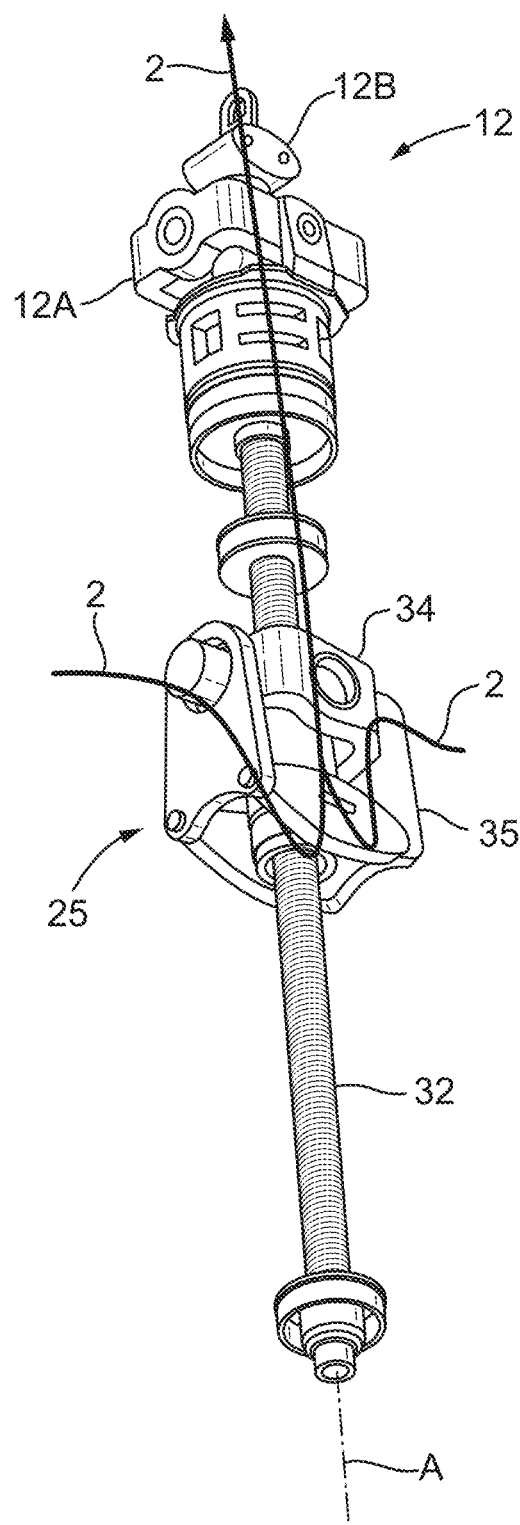

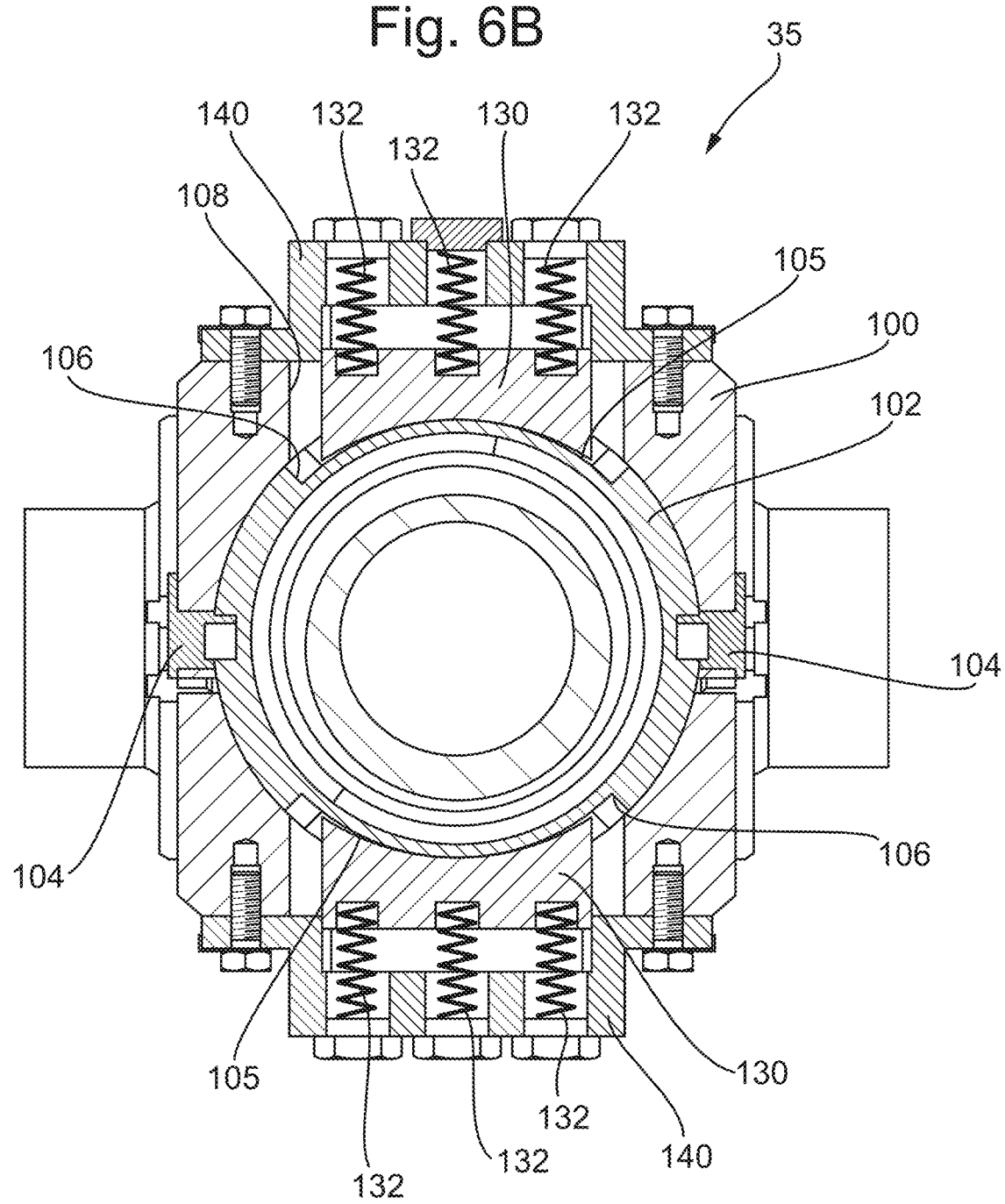

ACTUATOR

FOREIGN PRIORITY

This application claims priority to European Patent Application No. 19306070.4 filed Sep. 4, 2019, the entire contents of which is incorporated herein by reference.

TECHNICAL FIELD

The present disclosure relates to an actuator, for example a trimmable horizontal stabiliser actuator ("THSA") for an aircraft, wherein the actuator includes a primary load path and a secondary load path that is configured to carry the load of the actuator upon failure of the primary load path.

BACKGROUND

Actuators typically provide a structural link between stationary parts of the actuator (and the object to which the actuator is attached), which provide a driving force for the actuator, and the moving parts of the actuator that actuate a component. Various loads are transmitted from the component to the stationary parts of the actuator via the moving parts thereof. Most actuators provide this structural link in the form of a load path, along which various tolerances are provided between components to account for excessive loading in use.

An example of such an actuator is a trimmable horizontal stabiliser actuator ("THSA") for an aircraft, which has to transmit various aerodynamic loads in use (e.g., flutter caused by turbulence). In some cases such actuators comprise a primary load path that is configured to transmit aerodynamic loads in normal condition, and a secondary load path that is configured to transmit aerodynamic loads upon failure of the primary load path. During normal use, the secondary load path is intended to remain in an unloaded condition.

It is desired to provide a mechanism to avoid undesired loading of the secondary load path during normal operation.

SUMMARY

According to an aspect there is provided an actuator comprising screw shaft and a nut assembly. The nut assembly comprises a primary nut for transmitting load through the actuator along a primary load path, and a secondary nut for transmitting load through the actuator along a secondary load path. The secondary nut comprises first and second portions movable relative to one another. As load is transmitted through the actuator along the primary load path the secondary nut does not transmit load through the actuator, wherein upon failure of the primary load path the first and second portions move relative to each other, such relative movement causing the first and second portions to engage the screw shaft and enable transmittal of load through the secondary nut of the actuator along the secondary load path.

The use of a secondary nut having first and second axially movable portions as described above leads to an improved mechanism that avoids undesired loading of the secondary load path during normal operation, as well as an improved mechanism for transitioning between the primary load path and secondary load path upon failure of the primary load path.

The first portion may be configured to move between a first position in which the first portion does not engage (and/or contact) the screw shaft, and a second position in which the first portion engages (and/or contacts) the screw shaft to permit load to be transferred through the secondary nut via the first portion.

The second portion may be configured to move between a first position in which the second portion does not engage (and/or contact) the screw shaft, and a second position in which the second portion engages (and/or contacts) the screw shaft to permit load to be transferred through the secondary nut via the second portion.

The actuator may further comprise a resilient member (e.g., a spring such as a coil spring located concentrically within the first and second portions) biased between the first portion and the second portion and configured to cause said relative movement of the first and second portions to engage/contact the screw shaft. This helps to ensure that the first and second portions are moved apart efficiently and into full engagement/contact with the screw shaft.

The actuator may further comprise one or more fuse pins configured to prevent said relative movement of the first and second portions to engage the screw shaft whilst load is transmitted through the actuator along the primary load path. These pins can help to prevent inadvertent movement of the first and second portions prior to a predetermined shear force on the pins. The fuse pins may extend radially inwardly through the first and second portions, which optimises the reliability of the fuse pins to shear at the predetermined shear force.

One of the first and second portions may slot inside the other of the first and second portions (e.g., concentrically) to enable said relative movement therebetween in an axial direction. This can provide a compact assembly, especially when combined with the coil spring located concentrically within the first and second portions and/or fuse pins extending radially inwardly.

At least one of the first and second portions may comprise a screw thread, wherein the screw thread may be disengaged from the screw shaft when load is transmitted through the actuator along the primary load path, and moved into engagement with the screw shaft to enable transmittal of load through the actuator along the secondary load path upon said relative movement of the first and second portions.

Both of the first and second portions may comprise a screw thread, wherein the screw threads may both be disengaged from the screw shaft when load is transmitted through the actuator along the primary load path, and both moved into engagement with the screw shaft to enable transmittal of load through the actuator along the secondary load path upon said relative movement of the first and second portions.

The screw thread on the first portion may be biased in a first axial direction and against one side of a screw thread of the screw shaft, and the screw thread on the second portion may be biased in a second, opposite axial direction and against the other side of the screw thread of the screw shaft. This also provides a compact assembly, especially when combined with the concentric arrangements of first and second portions, coil spring located concentrically within the first and second portions and/or fuse pins extending radially inwardly as described above.

The actuator may further comprise one or more movable abutments configured to engage one or other, or both of the first and second portions after said relative movement of the first and second portions to engage the screw shaft, such that upon such engagement the movable abutments are configured to prevent further relative movement of the first and second portions. This prevents the first portion and the second portion from moving towards each other in the axial direction, even during a high reverse load, for example due to flutter, which could otherwise overcome the action of the resilient member.

The one or more movable abutments may be restricted against axial movement, and may each be configured to slide into a respective circumferential cavity located in one or other of the first and second portions so as to prevent said further relative movement of the first and second portions.

The actuator may further comprise one or more resilient members configured to bias the one or more movable abutments into said engagement with one or other, or both of the first and second portions so as to prevent said further relative movement of the first and second portions. This provides a substantially immediate movement of the movable abutments as soon as the first and second portions move relative to each other as described above and elsewhere herein.

The actuator may be for an aircraft, for example a flight control surface of an aircraft. Aspects of the disclosure extend to an aircraft comprising an actuator as described above.

BRIEF DESCRIPTION OF THE DRAWINGS

Various embodiments will now be described, by way of example only, and with reference to the accompanying drawings in which:

FIG. 2 shows one embodiment of a primary and secondary load path of the actuator of FIG. 1;

FIGS. 3A and 3B show examples of the primary and secondary load paths, in which the primary load path is shown in FIG. 3A, while the secondary load path is shown in FIG. 3B;

FIGS. 6A and 6B show features similar to FIGS. 5A and 5B, but wherein one or more components of the primary load path has failed

DETAILED DESCRIPTION

Herewith will be described various embodiments of an actuator, for example a flight control actuator, such as a trimmable horizontal stabiliser actuator ("THSA") for an aircraft, wherein the actuator includes a primary load path and a secondary load path that is configured to carry the load of the actuator upon failure of the primary load path.

Figure 1:
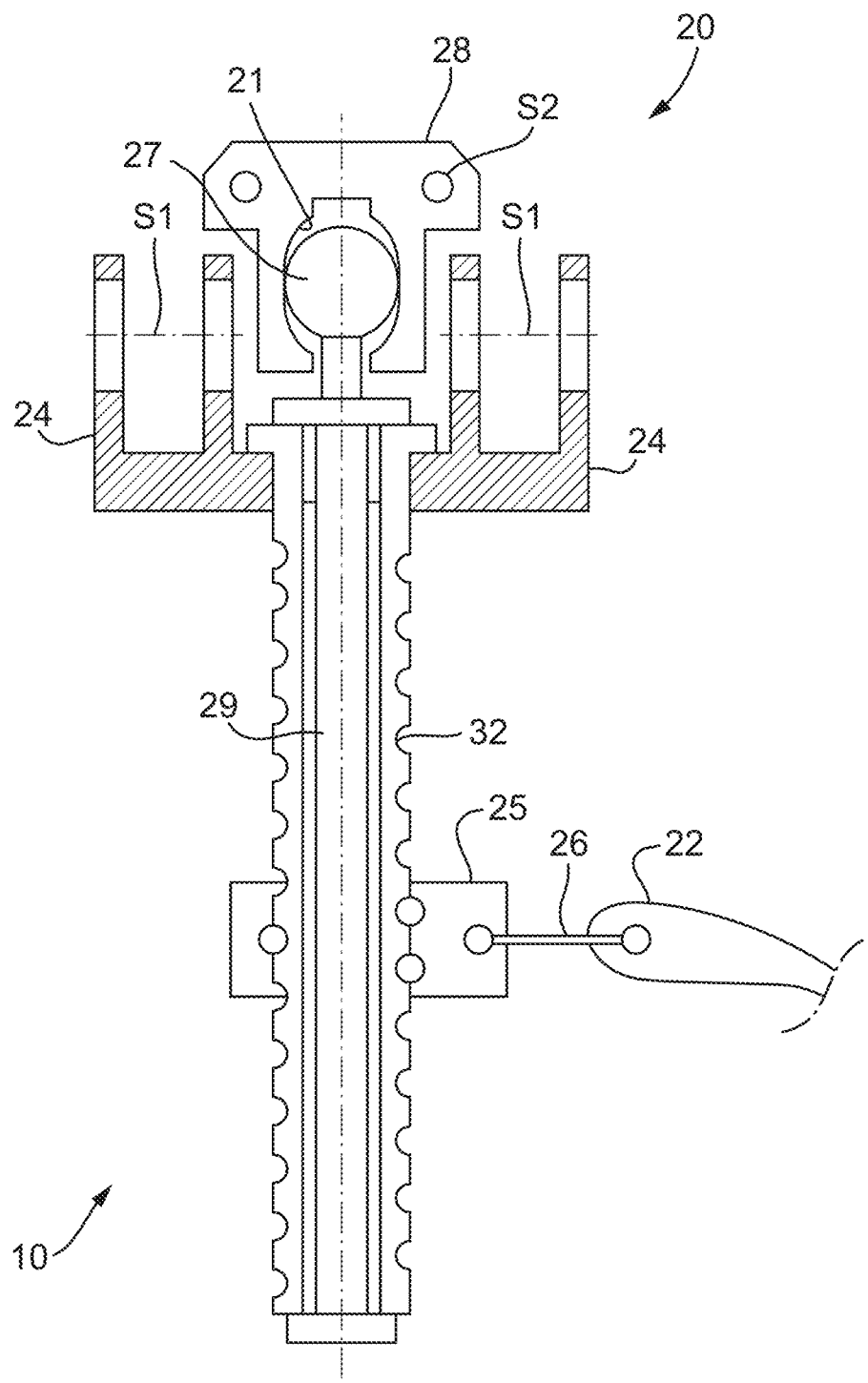
FIG. 1 shows an embodiment of an actuator.

FIG. 1 shows an embodiment of an actuator 10, which may be a flight control actuator, such as a trimmable horizontal stabiliser actuator ("THSA"). The actuator 10 may include a primary load path with a screw shaft 32 (e.g., that is hollow) connected at its upper end to the aircraft via a first joint system 24 (e.g., a Carden joint system) joining with first aircraft structural elements 51. The primary load path further includes a lower attachment (or nut assembly) 25 mounted on the screw 32, and the lower attachment 25 is connected to the stabiliser 22 of the aircraft, this connection being achieved for example by a second joint system 26 (e.g., a further Carden joint system).

The secondary load path may be provided by means of a tie bar 29 that is within the screw 32. The tie bar 29 is terminated at its upper end by a male portion, in this case optionally taking the form of a spherical head 27, which is mounted within a female portion on a fastening piece 28, optionally taking the form of a recess 21. The fastening piece 28 may be connected to the structure of the aircraft via second aircraft structural elements S2. The system may also include some means for preventing motion of the lower attachment 25 relative to the screw 32 and/or for fixing the stabiliser 22/second joint system 26 in place when the primary load path fails. Thus, the lower attachment 25, also includes secondary load path elements that are enabled for use upon failure of the primary load path.

It will be appreciated from FIG. 1 that movement of the spherical head 27 may be restricted by the upper and lower shoulders of the recess 21. Consequently, the stabiliser 22 can either be safely held in a single position (in the case where the lower attachment locks in place) or in some arrangements it might be permitted to continue normal movement should the tie bar 29 be connected with the screw 32 in such a way as to permit continued rotation of the screw 32 even after failure preventing it from carrying axial loads.

FIG. 2 shows one possible arrangement for the primary and secondary load paths of the actuator 10, in which a component (e.g., a horizontal stabiliser) 22 is connected by optional arms and bushings to a lower primary attachment 34 which connects it to a screw 32. As described in more detail below, the lower primary attachment 34 may include a primary nut 50 that is operatively connected (e.g., via primary trunnions 51) to a gimbal assembly 52 (FIG. 4), wherein the primary nut 50 comprises a ballscrew assembly (not shown) such that the gimbal assembly 52 is coupled to the screw shaft 32 via the ballscrew assembly of the primary nut 50.

The lower primary attachment 34 forms part of the lower attachment 25 of the actuator 10 that is dedicated to the primary load path. At the upper end of the actuator 10 a joint system 24 (such as a Cardan joint system) will typically include no back elements along with the primary load path gimbal, which may be coupled to the aircraft structure. During normal use, e.g., without any failure, the loading for the actuator 10 is carried via the primary load path.

In the event of a failure of the primary load path the loading is transferred to the secondary load path. In this case at the lower attachment 25 the horizontal stabiliser 22 is connected by the (optional) stabiliser arms and bushings to a lower secondary attachment 35.

The lower secondary attachment 35 typically comprises a secondary nut 60 (FIG. 4) having a screw thread that is arranged to lock with the threads of the screw 32, preventing movement of the horizontal stabiliser 22 when the secondary load path is engaged. As described in more detail below (see FIG. 4), the lower secondary attachment 35 may comprise the secondary nut 60, which may be operatively connected to load transfer plates 62 (e.g., via secondary trunnions 61). The secondary nut 60 may comprise screw threads which can be joined to the thread of the screw 23 when the secondary load path is engaged.

From the lower secondary attachment 35 the load in the secondary load path may be transmitted via the screw 32 along the tie bar tube/rod 29 (FIG. 1) and optionally through the male end of the tie bar rod 29, which in this embodiment is a tie bar sphere 27, and to an upper secondary attachment 20. Thus, the lower secondary attachment 35 forms part of the lower attachment 25 of the actuator 10 that is dedicated to the secondary load path.

Examples of the primary and secondary load paths are shown in FIGS. 3A and 3B. The primary load path is shown in FIG. 3A, while the secondary load path is shown in FIG.

3B wherein the detour taken by the secondary load path through the lower secondary attachment 35 is evident.

FIG. 3A shows the actuator 10 comprising a static portion 12 that is configured to attach to a stationary object, for example an aircraft fuselage. The actuator 10 further comprises a motor (not shown) or other driving means configured to rotate the screw shaft 32 about an axis A.

The actuator 10 further comprises a lower attachment 25 that is configured to move axially along the screw shaft 32 upon rotation thereof. The component 22, for example a flight control surface, may be operatively connected to the lower attachment 25, such that movement of the lower attachment 25 along the axis A causes actuation of the component 22 by the actuator 10.

The static component 12 may comprise a primary portion 12A and a secondary portion 12B, which may be connected to different parts of the stationary object or may be connected via different connections, for example as described above in respect of FIGS. 1 and 2.

The lower attachment 25 comprises a primary attachment 34 and a secondary attachment 35, both of which may cooperate with the screw shaft 32 in order to drive the lower attachment 25 upon rotation thereof.

During normal operation (as shown in FIG. 1A) load is transferred from the component to which the actuator 10 is attached to the primary attachment 34, and then to the primary portion 12A of the static component 12 via the screw shaft 32. This is referred to herein as a primary load path and is indicated at arrow 1.

Upon failure of one or more components of the primary load path (e.g., rupturing of the primary attachment 34 or one or more parts thereof) a secondary load path is provided that is configured to transmit load between the static component 12 and the component 22 to which the actuator 10 is attached.

FIG. 2 shows the secondary load path, wherein load is transferred from the component 22 to which the actuator 10 is attached to the secondary attachment 35, and then to the secondary portion 12B via the screw shaft 32. The secondary load path is indicated at arrow 2.

Figure 4:
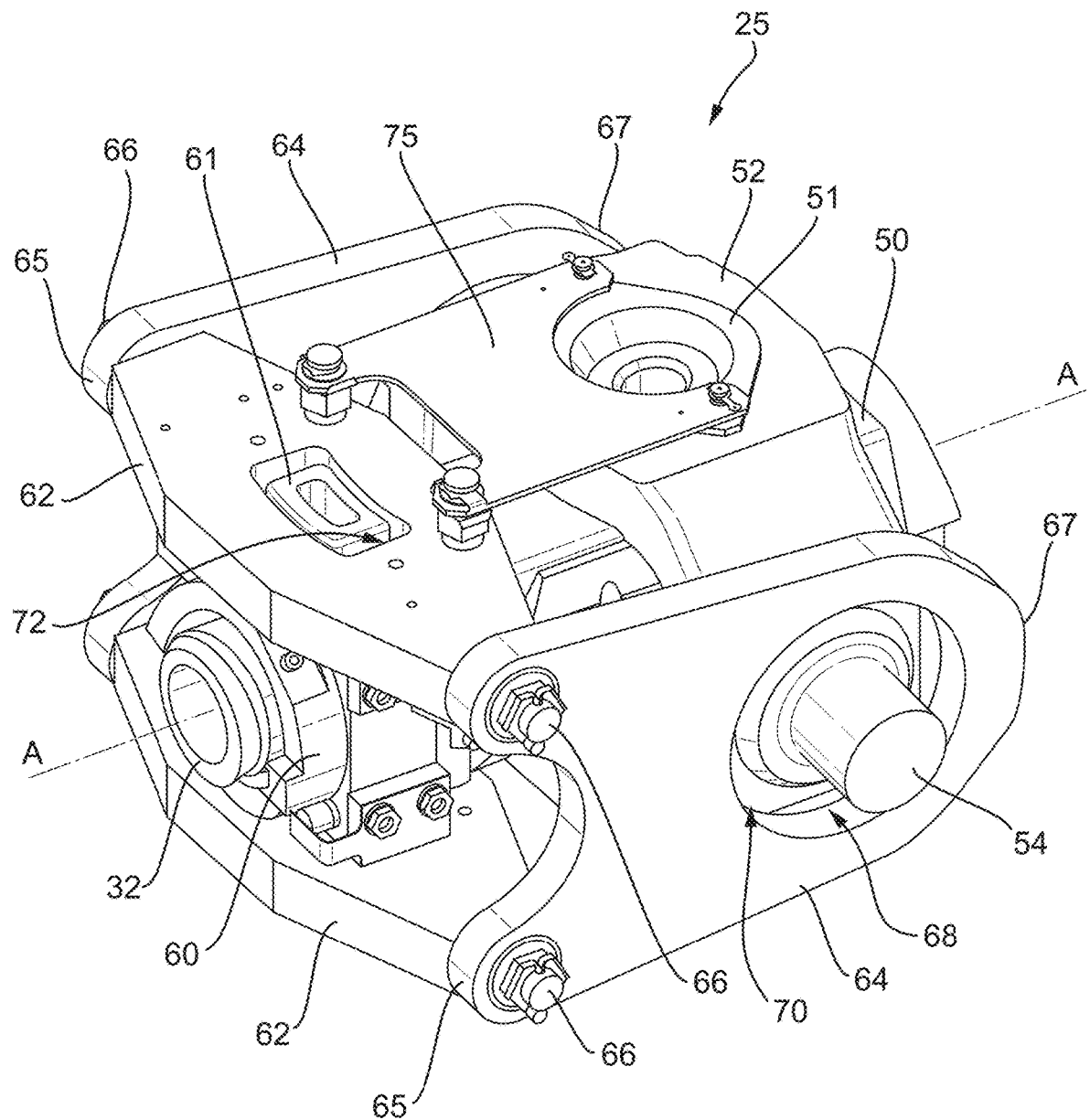
FIG. 4 shows a lower attachment of the nut assembly of the embodiment of FIG. 1 in more detail, and including a portion of the screw shaft of this embodiment for reference.

FIG. 4 shows the lower attachment 25 in more detail, and including a portion of the screw shaft 32 for reference.

The primary attachment 34 comprises a gimbal assembly 52 that is located around the screw shaft 32, and is operatively connected to a primary nut 50 that comprises a suitable ballscrew assembly (or similar means) as described above for cooperating with the screw shaft 32, such that rotation of the screw shaft 32 causes axial movement of the primary attachment 34 and, in turn, the lower attachment 25.

The primary attachment 34 (e.g., the gimbal assembly 52 thereof) further comprises a pair of connectors 54 configured to attach or operatively connect to the component 22, such that axial movement of the primary attachment 34 causes actuation of the component 22.

The secondary attachment 35 comprises a secondary nut 60 that is located around the screw shaft 32. The secondary nut 60 comprises a suitable screw thread for cooperating with the screw shaft 32, such that upon failure of the one or more components of the primary load path rotation of the screw shaft 32 will cause axial movement of the secondary attachment 35 and, in turn, the lower attachment 25.

The secondary attachment 35 further comprises two opposed arm portions 64 that run axially along the sides of the lower attachment 25 and are connected to upper and lower transfer plates 62 of the secondary attachment 35 at a first axial end 65 thereof, for example using fasteners 66. Located adjacent each second axial end 67 of the arm portions 64 (opposite the first axial end 65) is an aperture 68 that circumscribes a respective connector 54 of the primary attachment 34. The apertures 68 may be configured to engage with the component 22 upon failure of one or more components of the primary attachment 34, so that movement of the lower attachment 25 will still cause movement of the component 22 upon such failure.

The primary attachment 34 further comprises a pair of primary trunnions 51 that are connected to (or integral with) the ballscrew assembly 50. The primary trunnions 51 drive the gimbal assembly 52 (and component 22) upon axial movement of the ballscrew assembly 50 as caused by rotation of the screw shaft 32.

The lower attachment 25 is configured such that a first clearance 70 is provided between the connectors 54 and the surfaces of the aperture 68. Such clearance 70 is provided to ensure that the secondary attachment 35 is not engaged inadvertently, and to prevent substantial load being transferred through the secondary load path during normal operation. For example, the primary attachment 34 and the secondary attachment 35 may move relative to one another during operation, for example due to flutter of the component to which the actuator 10 is attached.

The secondary attachment 35 comprises a pair of secondary trunnions 61 that are each configured to engage with a respective one of the upper and lower transfer plates 62. The secondary trunnions 61 may drive the transfer plates 62 (and, in turn, the arm portions 64 and component 22) upon failure of one or more components of the primary attachment 34.

A second clearance 72 is provided between the secondary trunnions 61 and the transfer plates 62. Similar to the first clearance 70, this is provided to ensure that the secondary attachment 35 is not engaged inadvertently, and to prevent substantial load being transferred through the secondary load path during normal operation.

As described above the primary attachment 34 may comprise a ballscrew assembly 50 configured to engage the screw shaft 32, such that the primary attachment 34 is always engaged with the screw shaft 32 via the ball screw. In contrast, the secondary attachment 35 may comprise one or more simple screw threads on the secondary nut 60 that are configured to engage the screw shaft 16, but wherein a clearance is provided between the thread(s) on the secondary nut 60 and the thread on the screw shaft 32. Such clearance is provided for the same reason as that stated above in respect of the clearances 70, 72, namely to prevent engagement of the screw thread(s) on the secondary attachment 35 inadvertently during normal operation.

The lower attachment 25 may include a sheet plate 75 that keeps the secondary load path unloaded when the primary load path is functioning normally. It achieves this by maintaining the clearances 70, 72. In the event of failure of the primary load path, the sheet plate can break and allow loading of the secondary load path as described above, e.g., via the secondary trunnions 61 and transfer plates 62.

Figure 5A:
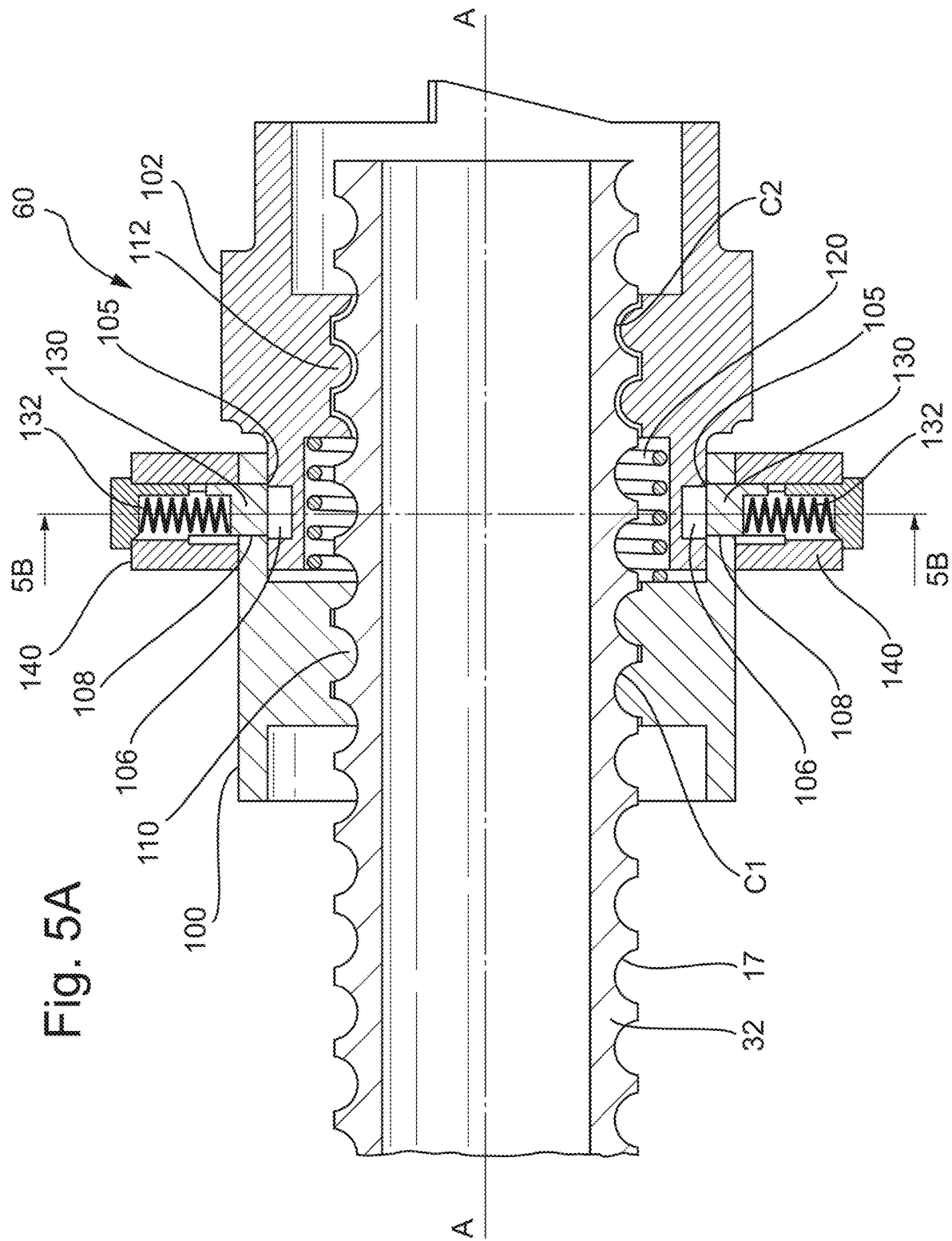
FIGS. 5A and 5B show a portion of the secondary nut of the embodiment of FIG. 1 in isolation with the screw shaft of this embodiment.
Figure 5B:
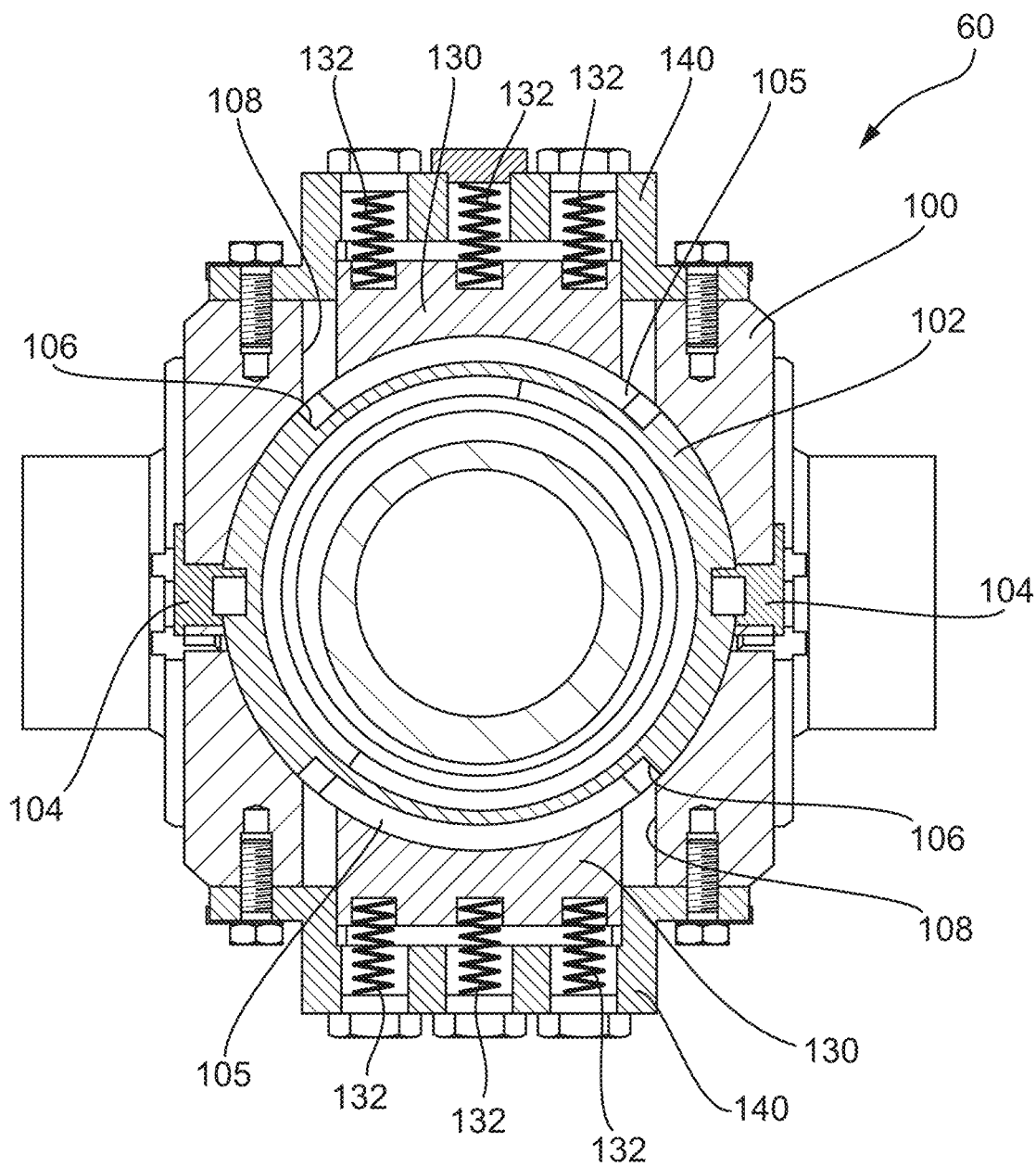

FIGS. 5A and 5B show a portion of the secondary nut 60 in isolation with the screw shaft 16. As seen in these views, the secondary nut 60 comprises a first portion 100 and a second portion 102. The first portion 100 comprises a first screw thread 110 configured to engage with a screw thread 17 of the screw shaft 32, and the second portion 102 also comprises a second screw thread 112 configured to engage with the screw thread 17 of the screw shaft 32.

There is a clearance C1, C2 between both of the screw threads 110, 112 on the secondary nut 60 and the screw thread 17 on the screw shaft 32. This means that during normal operation the screw thread 17 of the screw shaft 32 does not contact the screw threads 110, 112 on the secondary nut 60. The clearance C1 between the screw thread 110 of the first portion 100 and the screw shaft 32 may be smaller than the clearance C2 between the screw thread 112 of the second portion 102 and the screw shaft 32. In various embodiments, the clearance C1 may be between about 40% and about 60% of the clearance C2, for example about 50%. The clearance C1 may be about 1 mm, and the clearance C2 may be about 2 mm. As will be discussed in more detail below, providing different clearances C1, C2 for the first and second portions 100, 102 may provide the relative movement necessary to separate the first and second portions 100, 102 in use.

The primary nut 50, and any connections between the primary nut 50 and the secondary nut 60 are not shown in FIGS. 5A and 5B for brevity.

The secondary nut 60 may further comprise one or more fuse pins 104 that are located between the first and second portions 100, 102, wherein the fuse pins 104 are configured to maintain the relative positions of the first portion 100 and the second portion 102 during normal operation. As shown in FIG. 5B, the fuse pins may extend radially (with respect to the axis A) through both the first portion 100 and the second portion 102 so as to hold the first and second portions 100, 102 against substantial relative movement. The only relative movement between the first and second portions 100, 102 may be due to providing different clearances C1, C2 as discussed above for the screw threads 110, 112 of the first and second portions 100, 102. The clearances C1, C2 may be provided so as to avoid any loads being passed to the secondary nut 60 during normal operation.

A resilient member 120 (e.g., a coil spring) may be biased between the first portion 100 and the second portion 102, and configured to urge these components away from each other in an axial direction. As stated above during normal operation the first portion 100 does not substantially move relative to the second portion 102, for example due to the fuse pins 104. As such, the resilient member 120 simply bears against the first portion 100 and the second portion 102 without causing substantial relative movement therebetween.

Due to the clearances C1, C2 there may be no contact between the secondary nut 60 and the screw shaft 32 during normal operation. For example, the fuse pins 104 may be configured such that they will break before one or other of the clearances C1, C2 are reduced to zero (i.e., before one or other of the screw threads 110, 112 contact the screw shaft 32).

Figure 6A:
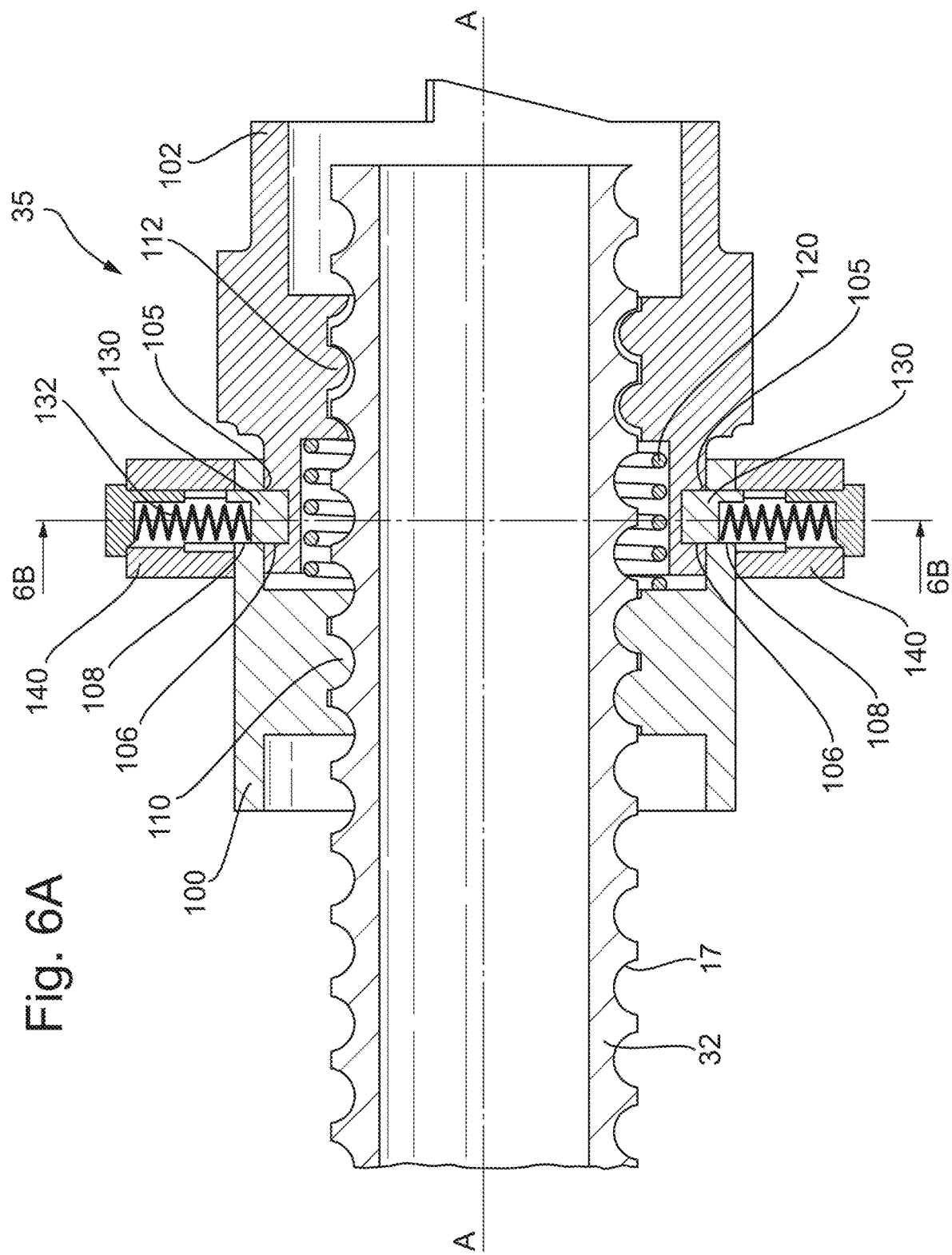

The secondary nut 60 may further comprise one or more movable abutments (e.g., plates) 130 configured to move between a first position (as shown in FIGS. 5A and 5B) in which they do not inhibit relative movement of the first and second portions 100, 102 and a second position (as shown in FIGS. 6A and 6B) in which the movable abutments (130) prevent further relative movement of the first and second portions 100, 102. This will be discussed in more detail below.

The movable abutments 130 may be configured to slide in a radial direction (relative to axis A), through circumferentially extending slots in the first portion 100 and into circumferentially extending slots 106 in the second portion 102. In their first position, however, the movable abutments 130 do not extend into the slots 106 in the second portion 102. Instead, in the illustrated embodiment the movable abutments 130 may be biased against a respective surface or shoulder 105 of the second portion 102.

The movable abutments 130 may be biased radially inward and, e.g., against the respective surface or shoulder 105 by one or more resilient members 132. The resilient members 132 may be held within one or more housings 140 that may be fastened to one or other of the first and second portions 100, 102 (in the illustrated embodiment, they are fastened to the first portion 100).

FIGS. 6A and 6B show features similar to FIGS. 5A and 5B, but wherein one or more components of the primary load path has failed.

In this situation a failure of the primary load path has caused relative movement of the first and second portions 100, 102, such that, for example, the fuse pins 104 have broken. This means that the resilient member 120 is able to move the first and second portions 100, 102 away from each other in an axial direction, which means that the resilient member 120 biases both the first portion 100 and the second portion 102 against the screw thread 17 of the screw shaft 32. Both of the clearances C1, C2 described above in respect of FIGS. 5A and 5B have been reduced to zero.

The screw thread 110 on the first portion 100 may be biased in a first axial direction and against one side of the screw thread 17 of the screw shaft 32, whereas the screw thread 112 on the second portion 102 may be biased in a second, opposite axial direction and against the other side of the screw thread 17 of the screw shaft 32. This reduces the clearances C1, C2 to zero as described above and substantially reduces or eliminates any backlash between the secondary nut 35 and the screw shaft 32, whilst activating the abutments 130 so that they are able to move to their second position.

Such features can help in reducing the overall backlash of the actuator 10 during a secondary load operation, when the primary load path fails. In embodiments in which the actuator 10 is a trimmable horizontal stabiliser actuator (for example), the features presented herewith can enable the actuator 10 to meet certification requirements that were previously only achieved for a primary load path in respect of the backlash. For example, such requirements have included that the backlash of a THSA may not exceed 0.034° (which refers to the flight control surface itself). The embodiments presented herewith can enable the secondary load path to meet this requirement as well as the primary load path.

In the situation shown in FIGS. 6A and 6B the movable abutments 130 have moved to their second position, in which they occupy the circumferentially extending slots 106 of the second portion 102. For example, the shoulder portions 105 have shifted due to the shift of the second portion 102 in the axial direction, such that the movable abutments 130 can move past the shoulder portions 105. Through the action of the resilient members 132, the movable abutments 130 have slid into the circumferentially extending slots 106. This prevents the first portion 100 and the second portion 102 from moving towards each other in the axial direction, even during a high reverse load, for example due to flutter, which could otherwise overcome the action of the resilient member 120. Suitable sensors may be provided to detect any reverse load or other relative movement of the first portion 100 and the second portion 102 during a secondary load path situation.

Although the present disclosure has been described with reference to various embodiments, it will be understood by those skilled in the art that various changes in form and detail may be made without departing from the scope of the invention as set forth in the accompanying claims.

The invention claimed is:

1. An actuator comprising:
   a screw shaft;
   a nut assembly,
   wherein the nut assembly comprises a primary nut for transmitting load through the actuator along a primary load path, and a secondary nut for transmitting load through the actuator along a secondary load path,
   wherein the secondary nut comprises first and second portions movable relative to one another,
   wherein as load is transmitted through the actuator along the primary load path the secondary nut does not transmit load through the actuator and upon failure of the primary load path the first and second portions move relative to each other, such relative movement causing the first and second portions to engage the screw shaft and enable transmittal of load through the secondary nut of the actuator along the secondary load path; and
   one or more movable abutments configured to engage one or other, or both of the first and second portions after said relative movement of the first and second portions to engage the screw shaft, such that upon such engagement the movable abutments are configured to prevent further relative movement of the first and second portions.

2. The actuator as claimed in claim 1, wherein the first portion is configured to move between a first position in which the first portion does not engage the screw shaft, and a second position in which the first portion engages the screw shaft to permit load to be transferred through the secondary nut via the first portion.

3. The actuator as claimed in claim 2, wherein the second portion is configured to move between a first position in which the second portion does not engage the screw shaft, and a second position in which the second portion engages the screw shaft to permit load to be transferred through the secondary nut via the second portion.

4. The actuator as claimed in claim 3, further comprising:
   a resilient member biased between the first portion and the second portion and configured to cause said relative movement of the first and second portions to engage the screw shaft.

5. The actuator as claimed in claim 1, further comprising:
   one or more fuse pins configured to prevent said relative movement of the first and second portions to engage the screw shaft whilst load is transmitted through the actuator along the primary load path.

6. The actuator as claimed in claim 5, wherein said fuse pins extend radially inwardly through the first and second portions.

7. The actuator as claimed in claim 1, wherein one of the first and second portions slots inside the other of the first and second portions to enable said relative movement therebetween in an axial direction.

8. The actuator as claimed in claim 1, wherein at least one of the first and second portions comprises a screw thread, and the screw thread is disengaged from the screw shaft when load is transmitted through the actuator along the primary load path, and moved into engagement with the screw shaft to enable transmittal of load through the actuator along the secondary load path upon said relative movement of the first and second portions.

9. An actuator as claimed in claim 8, wherein both of the first and second portions comprise a screw thread, and the screw threads are both disengaged from the screw shaft when load is transmitted through the actuator along the primary load path, and both are moved into engagement with the screw shaft to enable transmittal of load through the actuator along the secondary load path upon said relative movement of the first and second portions.

10. An actuator as claimed in claim 9, wherein the screw thread on the first portion is biased in a first axial direction and against one side of a screw thread of the screw shaft, and the screw thread on the second portion is biased in a second, opposite axial direction and against the other side of the screw thread of the screw shaft.

11. An actuator as claimed in claim 1, wherein the one or more movable abutments are restricted against axial movement, and are each configured to slide into a respective circumferential cavity located in one or other of the first and second portions so as to prevent said further relative movement of the first and second portions.

12. An actuator as claimed in claim 1, further comprising:
   one or more resilient members configured to bias the one or more movable abutments into said engagement with one or other, or both of the first and second portions so as to prevent said further relative movement of the first and second portions.

13. The actuator as claimed in claim 1, wherein the actuator is for a flight control surface of an aircraft.

14. An aircraft comprising:
   an actuator as claimed in claim 1,
   wherein the actuator is for a flight control surface of an aircraft.

* * * * *